United States Patent
Morris et al.

(10) Patent No.: US 9,782,829 B2
(45) Date of Patent: Oct. 10, 2017

(54) METHODS AND SYSTEMS FOR MANUFACTURING COMPONENTS FROM ARTICLES FORMED BY ADDITIVE-MANUFACTURING PROCESSES

(71) Applicant: HONEYWELL INTERNATIONAL INC., Morristown, NJ (US)

(72) Inventors: Mark C. Morris, Phoenix, AZ (US); Klaus Helmut Schwarz, Chandler, AZ (US); Donald G. Godfrey, Phoenix, AZ (US); Andy Szuromi, Phoenix, AZ (US)

(73) Assignee: HONEYWELL INTERNATIONAL INC., Morris Plains, NJ (US)

( * ) Notice: Subject to any disclaimer, the term of this patent is extended or adjusted under 35 U.S.C. 154(b) by 425 days.

(21) Appl. No.: 14/089,930

(22) Filed: Nov. 26, 2013

(65) Prior Publication Data
US 2015/0144496 A1 May 28, 2015

(51) Int. Cl.
| | |
|---|---|
| *B23H 3/00* | (2006.01) |
| *B23H 9/10* | (2006.01) |
| *C25F 3/26* | (2006.01) |
| *C25D 7/00* | (2006.01) |
| *B22F 5/04* | (2006.01) |

(Continued)

(52) U.S. Cl.
CPC .............. *B22F 5/04* (2013.01); *B22F 3/1055* (2013.01); *B22F 5/10* (2013.01); *B23H 9/10* (2013.01); *C25F 3/26* (2013.01); *C25F 7/00* (2013.01); *F01D 5/186* (2013.01); *F01D 5/288* (2013.01); *B22F 2003/247* (2013.01); *B22F 2999/00* (2013.01); *B23H 3/00* (2013.01);

(Continued)

(58) Field of Classification Search
CPC . C25D 3/44; C25D 7/00; C25D 11/00; C25D 1/20
See application file for complete search history.

(56) References Cited

U.S. PATENT DOCUMENTS

| | | | |
|---|---|---|---|
| 3,410,781 A | | 11/1968 | Carlson et al. |
| 3,718,547 A | * | 2/1973 | Cooke .................... C25D 11/04 |
| | | | 205/139 |

(Continued)

FOREIGN PATENT DOCUMENTS

| | | | | |
|---|---|---|---|---|
| DE | 2409405 | * | 2/1974 | ............. C25D 11/26 |
| EP | 487240 | * | 11/1990 | ......... H01L 39/2409 |
| KR | 2008079794 A | | 9/2008 | |

OTHER PUBLICATIONS

Kopeliovich, D.: "Electrochemical machining"; retrieved from the Internet on Sep. 23, 2013, URL: http://www.substech.com/dokuwiki/doku.php?id=electrochemical_machining.

*Primary Examiner* — Stefanie S Wittenberg
(74) *Attorney, Agent, or Firm* — Lorenz & Kopf, LLP (57) ABSTRACT

A method is provided for manufacturing a component. The method includes connecting a component comprising an internal passage and formed by an additive manufacturing process to a power supply, the component functioning as an anode, connecting a cathode to the power supply, the cathode being disposed in an electrolyte solution, the cathode being positioned externally to the internal passage of the component, contacting the internal passage of the component with the electrolyte solution, and using the power supply, applying a potential difference and current flow between the component and the cathode.

7 Claims, 10 Drawing Sheets

(51) Int. Cl.
*F01D 5/18* (2006.01)
*F01D 5/28* (2006.01)
*B22F 3/105* (2006.01)
*B22F 5/10* (2006.01)
*C25F 7/00* (2006.01)
*B22F 3/24* (2006.01)

(52) U.S. Cl.
CPC .......... *F01D 5/187* (2013.01); *F05D 2230/31* (2013.01); *Y02P 10/295* (2015.11)

(56) References Cited

U.S. PATENT DOCUMENTS

| | | | | |
|---|---|---|---|---|
| 5,135,625 A | * | 8/1992 | Lewy | C25F 7/00 204/237 |
| 5,294,309 A | * | 3/1994 | Seimiya | B23H 9/005 205/660 |
| 6,200,439 B1 | * | 3/2001 | Wei | B23H 3/04 204/284 |
| 6,660,156 B2 | | 12/2003 | Lorincz | |
| 6,800,829 B1 | * | 10/2004 | Nimmons | B23H 1/00 219/69.11 |
| 8,506,836 B2 | | 8/2013 | Szuromi et al. | |
| 2006/0283717 A1 | * | 12/2006 | Bloch | B23H 9/16 205/666 |
| 2007/0125661 A1 | * | 6/2007 | Wang | B23H 5/08 205/651 |
| 2008/0210571 A1 | * | 9/2008 | Comaty | B23H 9/00 205/673 |
| 2011/0070096 A1 | * | 3/2011 | Wei | B23H 3/04 416/97 R |
| 2013/0004309 A1 | * | 1/2013 | Sambasivan | C04B 35/195 415/208.1 |
| 2014/0018244 A1 | * | 1/2014 | Taylor | C25F 3/26 505/300 |

* cited by examiner

METHODS AND SYSTEMS FOR MANUFACTURING COMPONENTS FROM ARTICLES FORMED BY ADDITIVE-MANUFACTURING PROCESSES

TECHNICAL FIELD

The present invention generally relates to surface improvement methods for manufacturing metallic or electrically conductive components, and more particularly relates to methods for manufacturing components from articles formed by additive-manufacturing processes.

BACKGROUND

Components with relatively complex three-dimensional (3D) geometries raise difficult fabrication issues. Conventional fabrication techniques include forging, casting, and/or machining. Such conventional methods are not only expensive and have long lead-times, but may additionally have low yields. Development time and cost for certain components may also be magnified because such components generally require several iterations, including iterations as a result of intentional design decisions.

Additive manufacturing (AM) processes (including those which form "cores" for subsequent conventional casting) have been developed to fabricate components having relatively complex three dimensional geometries, including components with internal surfaces defining internal passages including internal hollow areas, internal channels, internal openings or the like (collectively referred to herein as "internal passages") for cooling, weight reduction, or otherwise. Additive Manufacturing is defined by the American Society for Testing and Materials (ASTM) as the "process of joining materials to make objects from 3D model data, usually layer upon layer, as opposed to subtractive manufacturing methodologies, such as traditional machining and casting." In an additive-manufacturing process, a model, such as a design model, of the component may be defined in any suitable manner. For example, the model may be designed with computer aided design (CAD) software. The model may include 3D coordinates of the entire configuration of the component including both external and internal surfaces. The model may include a number of successive 2D cross-sectional slices that together form the 3D component.

Components manufactured from additive manufacturing processes may have significant surface roughness, surface porosity, and cracks (hereinafter "surface-connected defects"), and internal porosity and cracks (hereinafter "internal defects"). The term "internal defects" also includes bond failures and cracks at the interfaces between successive cross-sectional deposit layers. Cracks may develop at these interfaces or cut through or across deposit layers dues to stresses inherent with the additive manufacturing process and/or the metallurgy of the build material.

A hot isostatic pressing (HIP) process may be used to eliminate internal defects but not the surface-connected defects. For components needing HIP because of the presence of internal defects, an encapsulation process may be used to bridge and cover the surface-connected defects, effectively converting the surface-connected defects into internal defects in preparation for subsequent hot isostatic pressing processing. However, for components with significant surface roughness, the encapsulation process may not sufficiently bridge and cover the surface-connected defects. Surface roughness may also be objectionable to customer perception of quality and may interfere with the functionality of the component. For example, excessive surface roughness may restrict or impede airflow, collect debris, act as a stress riser, and otherwise detract from the component design.

Unfortunately, the reduction of internal passage surface roughness presents a particular manufacturing challenge because of the general inaccessibility of the internal passage surfaces. Conventional polishing or milling techniques to reduce internal passage surface roughness are not as developed as they are for external surfaces. No effective process exists to uniformly reduce internal passage surface roughness to acceptable levels, thereby compromising the structural integrity, cosmetic appearance, functionality, and mechanical properties of the component, and also not allowing the encapsulation process to sufficiently bridge and cover the surface-connected defects in preparation for HIP processing. Even with encapsulation, faying surfaces of some surface-connected defects may not be sufficiently metallurgically diffusion bonded if excessively oxidized or otherwise insufficiently cleaned. A component with inadequate diffusion bonded surfaces has a compromised metallurgical surface integrity that reduces the overall metallurgical quality of the manufactured component.

Accordingly, it is desirable to provide methods for manufacturing components from components formed by additive-manufacturing processes. It is also desirable to provide methods that uniformly reduce surface roughness, including internal passage surface roughness, thereby improving the structural integrity, cosmetic appearance, functionality, mechanical properties, and fatigue life/strength of the component, that allow encapsulation of the additive-manufactured component to be effective in preparation for subsequent hot isostatic pressing (HIP) processing, and that improve metallurgical quality of the component. It is also desirable to provide methods for manufacturing components that improve yield, enable improved development cycle times and reduced tooling costs without sacrificing component performance or durability, enable multiple design iterations at relatively low cost and short delivery times, and permit internal configurations for components not otherwise possible with current casting technology. Furthermore, other desirable features and characteristics of the present invention will become apparent from the subsequent detailed description of the invention and the appended claims, taken in conjunction with the accompanying drawings and this background of the invention.

BRIEF SUMMARY

Methods and systems are provided for manufacturing a component. In one exemplary embodiment a system for manufacturing a component includes connecting a component including an internal passage and formed by an additive manufacturing process to a power supply, the component functioning as an anode, connecting a cathode to the power supply, the cathode being disposed in an electrolyte solution, the cathode being positioned externally to the internal passage of the component, contacting the internal passage of the component with the electrolyte solution, and using the power supply, applying a potential difference and current flow between the component and the cathode.

In another exemplary embodiment, denoted as "progressive electrolytic resistive layer method," a system for manufacturing a component includes a component including an internal passage or complex external surface geometry and formed by an additive manufacturing process, the component functioning as an anode, the internal passage being in contact with an electrolyte solution, a cathode disposed in the electrolyte solution, the cathode being positioned externally to the internal passage of the component, not in close proximity to the anode surfaces so as to not behave like a conforming cathode, and a power supply electrically connected to the component and the cathode. The power supply applies a potential difference and current flow between the component and the cathode.

This brief summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

BRIEF DESCRIPTION OF THE DRAWINGS

The present invention will hereinafter be described in conjunction with the following drawing figures, wherein like numerals denote like elements.

DETAILED DESCRIPTION

The following detailed description is merely exemplary in nature and is not intended to limit the invention or the application and uses of the invention. As used herein, the word "exemplary" means "serving as an example, instance, or illustration." Thus, any embodiment described herein as "exemplary" is not necessarily to be construed as preferred or advantageous over other embodiments. All of the embodiments described herein are exemplary embodiments provided to enable persons skilled in the art to make or use the invention and not to limit the scope of the invention which is defined by the claims. Furthermore, there is no intention to be bound by any expressed or implied theory presented in the preceding technical field, background, brief summary, or the following detailed description.

Various embodiments are directed to methods for manufacturing components from components formed by an additive manufacturing process such as electron beam melting or direct metal laser fusion in which sequential deposit layers of build material are fused and solidified according to a three-dimensional (3D) model. Other additive manufacturing processes may also be employed. The as-built component (hereinafter referred to as a "intermediate component") may have significant surface roughness caused, for example, by partial fusion or entrainment of metallic powder as the laser starts or stops its traverse or sweep at the edges of the each deposit layer, and by contamination, debris, oxidation, or the like. The intermediate component may also have internal porosity and cracks (hereinafter "internal defects") and surface porosity and cracks (hereinafter "surface-connected defects"). The term "internal defects" also includes "interface defects" such as bond failures and cracks at the interfaces between successive cross-sectional layers. The cracks develop at these interfaces or cut through or across deposit layers due to stresses inherent with the additive manufacturing process and/or the metallurgy of the build material. The term "surface-connected defects" as used herein includes porosity or cracks that are connected to the surface of the component. The surface-connected cracks have faying surfaces that may not be adequately metallurgically diffusion bonded. As used herein, the term "surface roughness" includes roughness at the surface (the intended sharp edge of the intermediate component), near surface (the roughness associated with loosely adhered components), and subsurface (the surface-connected defects contributing to roughness). The reduction in surface roughness improves the structural integrity, cosmetic appearance, functionality, fatigue life/strength, and mechanical properties of the component. Unfortunately, reduction of internal passage surface roughness presents a particular additive manufacturing challenge because of the general inaccessibility of the internal passage surfaces. As used herein, the term "internal passage" includes an internal hollow area, an internal channel, an internal opening or the like.

According to exemplary embodiments as described herein, in a method for manufacturing a component, by utilizing an electro-chemical micro-machining (ECMM) process that attacks the roughness on the airfoil internal and external surfaces, but is not detrimental in attacking the nickel base or cobalt base or other super-alloy substrates or electrically conductive substrates, the internal and external surface roughness can be improved without compromising the metallurgical integrity of the component. Prior art methods for machining internal cavities like abrasive/slurry honing attack only the smallest flow areas of the cooling cavities since the velocity of the cutting media is proportional to the cross sectional flow area of the cooling passage. Thus, the prior art methods do not provide a uniform reduction in the overall surface roughness on DMLS internal cooling surfaces. The presently described embodiments provide a procedure utilizing an ECMM process that more uniformly reduces internal and/or external surface roughness on DMLS components such that subsequent encapsulation techniques are then effective at bridging the surface defects, thus converting the surface defects to internal defects which can be eliminated via subsequent HIP processing.

The described embodiments utilize electro-chemical micro-machining (ECMM) to reduce surface roughness of internal surfaces of DMLS-formed components, thereby forming an enhanced internal surface. As used herein, the term "enhanced" or the like refers to a reduction in surface roughness and/or improvement in metallurgical quality and the term "enhanced surface" includes an enhanced surface, near surface, and subsurface. The term "internal surface" refers generally to a surface formed within the component, for example internal cooling air passages and the like. Conventional electro-chemical machining (ECM) utilizes a tool (cathode) that feeds towards the machined part (anode) to remove material. ECM is a controlled anodic dissolution of an electrically conductive work piece (the anode) due to a flow of high current at a low voltage difference through an electrolytic solution (typically a water based neutral salt solution). The prior art ECM will not machine internal surfaces and features since the tool (cathode) cannot be inserted inside the passages. The presently described ECMM embodiments utilize a remotely located cathode immersed in a highly conductive electrolytic solution. The component is a positively charged anode flushed in the electrolytic solution. In some embodiments, the component is charged with low voltage electrical potential from about 5 to about 50 volts, utilizing an electrical current from about 50 to about 5000 amperes ("amps"). In other embodiments, different voltages and/or currents may be used. The electrolytic solution is cycled through the internal cooling passages during the ECMM process until the appropriate amount of material is removed. The electrolyte concentration and electro-potential used in the machining operation is optimized based on process trial samples. In some embodiments, the electrolyte is a water based solution including sulfur dioxide (for increased cathodic reaction) and tetra-butyl ammonium bromide for enhanced thermal conductivity. Other electrolyte embodiments may also be utilized.

Subsequent to processing using the above-described ECMM process, the component may then be encapsulated and HIP processed to remove the surface and internal defects that were initially present in the component. In an embodiment, internal defects may be reduced or substantially eliminated by a HIP process or other consolidation treatment. In various embodiments, the HIP process may be subsequently performed in a finishing step, and at other times. These manufacturing methods yield a component with improved structural integrity, cosmetic appearance, functionality, metallurgical quality, and overall mechanical properties, including improved tensile and stress rupture strengths, improved fatigue life/strength, and improved manufacturing yield, enable improved development cycle times, reduce tooling costs without sacrificing component performance or durability, and permit internal configurations for components not otherwise possible with conventional fabrication techniques.

In further embodiments, this ECMM process may also be utilized as a more aggressive process to open the cooling flow areas of internal cooling passages to increase cooling flow rates as a rework operation on castings or DMLS components that are not providing acceptable cooling flow within the cooling passages. In accordance with these embodiments, additional substrate material (in excess of just the surface roughness region) is removed to increase the cross sectional flow area in the cooling passages to allow more coolant flow through the component. This eliminates the need for abrasive/slurry honing techniques that are traditionally used to increase passage flow areas of components.

While the advantages of the present invention as described herein will be described with reference to a turbine component (a high pressure turbine blade shown in FIGS. 2 and 4-5), the teachings of the present invention are generally applicable to any component manufactured from an intermediate component formed by an additive manufacturing process and may be used to reduce surface roughness and/or improve metallurgical quality of the manufactured component. The teachings of the present invention are especially applicable to components manufactured from an intermediate component formed by an additive manufacturing process, and that may include internal passages with relatively inaccessible rough internal surfaces (hereinafter "internal passage surfaces"). Exemplary components include, but are not limited to, turbine components, medical devices, weapons, and custom low volume components for internal combustion racing engines, articles manufactured by diffusion bonding of laminations or other methods wherein the internal surface quality is in need of improvement, etc.

Figure 1:
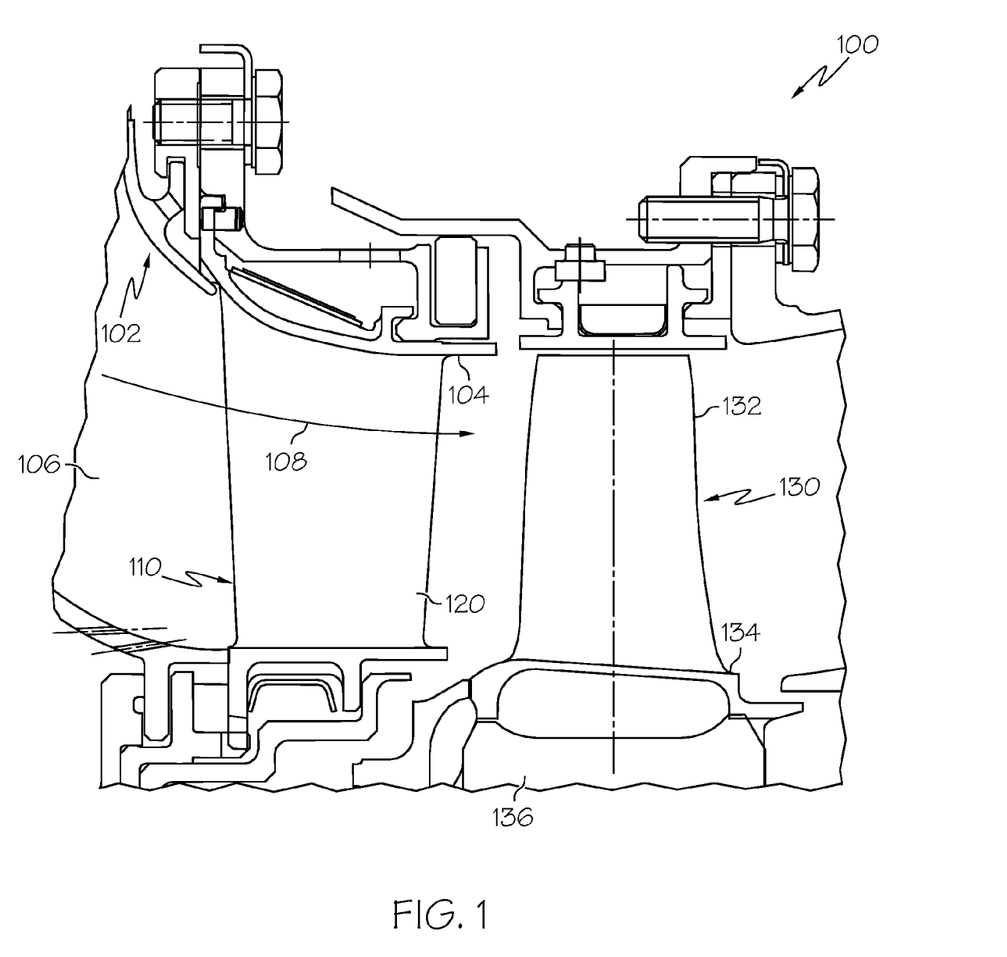
FIG. 1 is a partial cross-sectional view of a turbine section of an exemplary gas turbine engine assembly.

FIG. 1 is a fragmented vertical sectional view illustrating a partial turbine section 100 of a gas turbine engine assembly in accordance with an exemplary embodiment. The turbine section 100 and gas turbine engine assembly have an overall construction and operation that is generally understood by persons skilled in the art. In general terms, the turbine section 100 has a housing 102 with an annular duct wall 104 that defines a mainstream hot gas flow path 106 for receiving a flow of mainstream combustion gases 108 from an engine combustor (not shown). The housing 102 additionally houses at least one stator assembly 110 with stator vanes 120 and at least one turbine rotor assembly 130 with turbine rotor blades 132. The rotor blades 132 of the turbine rotor assembly 130 project radially outward from a turbine rotor platform 134 that is coupled to a turbine disk 136, which in turn circumscribes a shaft (not shown). During operation, the combustion gases 108 flow past axially spaced circumferential rows of stator vanes 120 and rotor blades 132 to drive the rotor blades 132 and the associated turbine rotor assembly 130 for power extraction. Other embodiments may be differently arranged.

Figure 2:
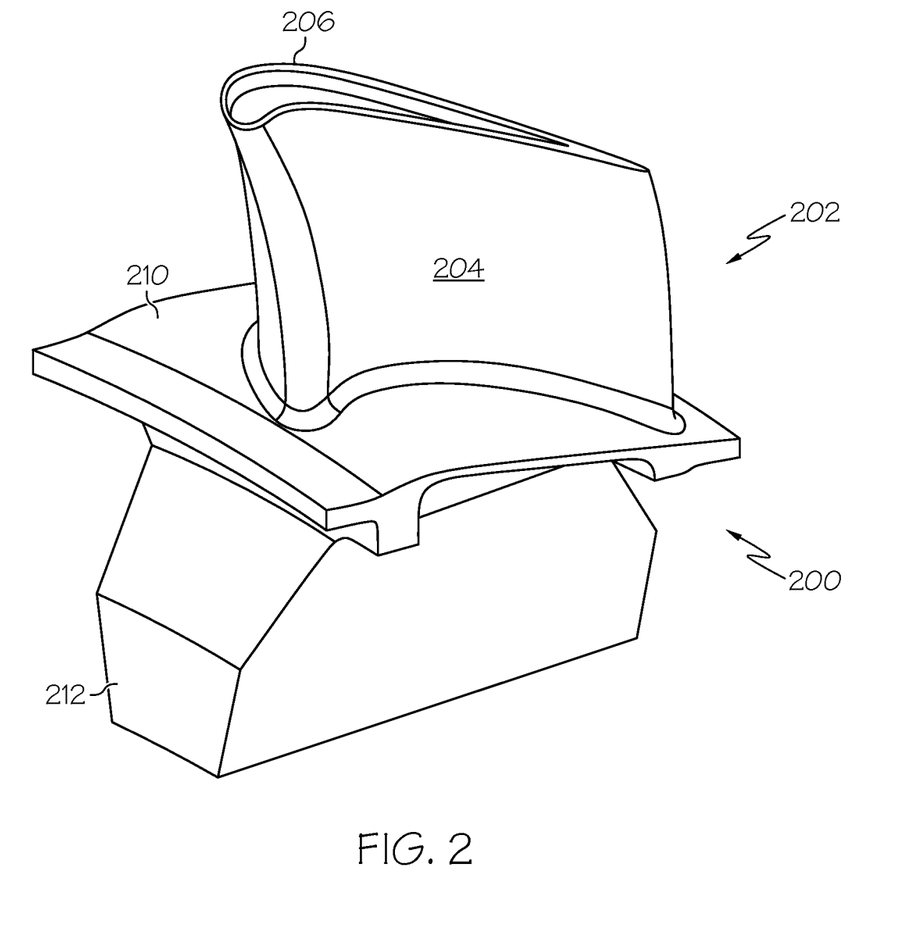
FIG. 2 is an isometric view of an exemplary turbine component.

FIG. 2 is an isometric view of a turbine component 200 in accordance with an exemplary embodiment and generally illustrates the relatively complex 3D geometric configuration typical of a turbine component, for example that may be incorporated into the turbine section 100 of FIG. 1. Although the turbine component 200 in FIG. 2 is depicted as a rotor blade, such as rotor blade 132 (FIG. 1), the exemplary embodiments discussed herein are applicable to any type of turbine component, such as stator vanes 120 (FIG. 1), and other engine components such as fan components, compressor components, and combustion components, as well as other components as noted above.

The turbine component 200 may include an airfoil 202 with a generally concave pressure side 204 and a generally convex suction side 206 opposed thereto. Each airfoil 202 may be coupled to a platform 210 that defines an inner boundary for the hot combustion gases that pass over airfoil 202 during engine operation. A mounting dovetail 212 may be integrally formed on the underside of the platform 210 for mounting the turbine component 200 within the turbine section 100 (FIG. 1). In an exemplary embodiment, the turbine component may include internal passages 502 (FIG. 5) to provide a cooling flow during engine operation. In this exemplary embodiment, the turbine component has a plurality of internal passages each with an internal surface 304a, and an external surface 304b. In other embodiments, the turbine component may be solid with only an external surface 304b.

Figure 3:
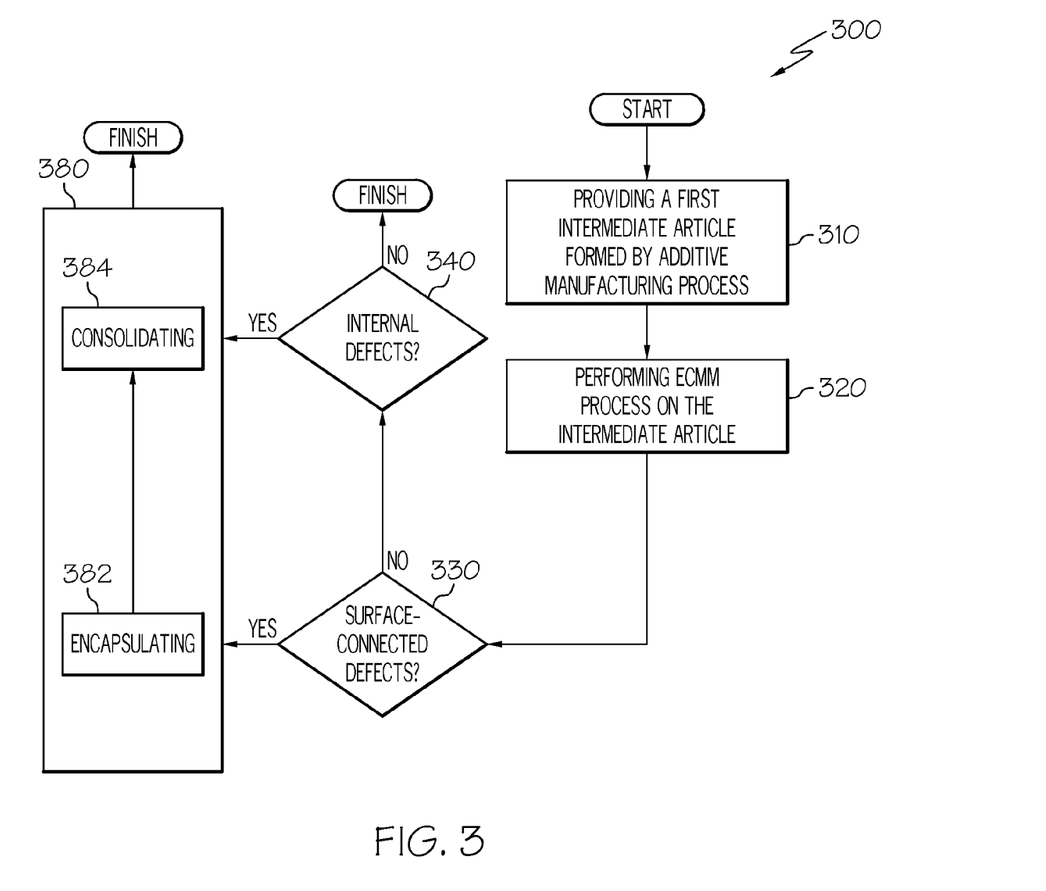
FIG. 3 is a flowchart of a method for manufacturing a component (such as the exemplary turbine component of FIG. 2) from an intermediate component, according to exemplary embodiments of the present invention.

As shown in FIGS. 2 through 5, in accordance with exemplary embodiments, a method 300 for manufacturing a component, such as the turbine component 200 of FIG. 2, begins by providing an intermediate component 500 formed by an additive manufacturing process (step 310) (FIG. 3). The intermediate component 500 may be an intermediate turbine component adapted to be formed into the turbine component 200. As noted above, Additive Manufacturing (AM) is defined by the American Society for Testing and Materials (ASTM) as the "process of joining materials to make objects from 3D model data, usually deposit layer upon deposit layer, as opposed to subtractive manufacturing methodologies, such as traditional machining and casting." In an additive-manufacturing process, a model, such as a design model, of the component may be defined in any suitable manner. For example, the model may be designed with computer aided design (CAD) software. The model may include 3D numeric coordinates of the entire configuration of the component including both external and internal surfaces of an airfoil, platform and dovetail. The model may include a number of successive 2D cross-sectional slices that together form the 3D component.

Some examples of additive manufacturing processes include: micro-pen deposition in which liquid media is dispensed with precision at the pen tip and then cured; selective laser sintering in which a laser is used to sinter a powder media in precisely controlled locations; laser wire deposition in which a wire feedstock is melted by a laser and then deposited and solidified in precise locations to build the product; electron beam melting; laser engineered net shaping; and direct metal deposition. In general, additive manufacturing techniques provide flexibility in free-form fabrication without geometric constraints, fast material processing time, and innovative joining techniques. In one exemplary embodiment, direct metal laser fusion (DMLF) is used to produce the additive-manufactured component. DMLF is a commercially available laser-based rapid prototyping and tooling process by which complex parts may be directly produced by precision melting and solidification of metal powder into successive deposit layers of larger structures, each deposit layer corresponding to a cross-sectional deposit layer of the 3D component. DMLF may include direct metal laser sintering (DMLS). Direct Metal Laser Sintering (DMLS) is an additive manufacturing process that fuses powder metal in progressive deposit layers. With DMLS, the fused sintered powder contains more porosity than DMLF, which in turn may necessitate a HIP process for densification. Other differences may include speed of building the intermediate component, grain or deposit size, etc.

Figure 4:
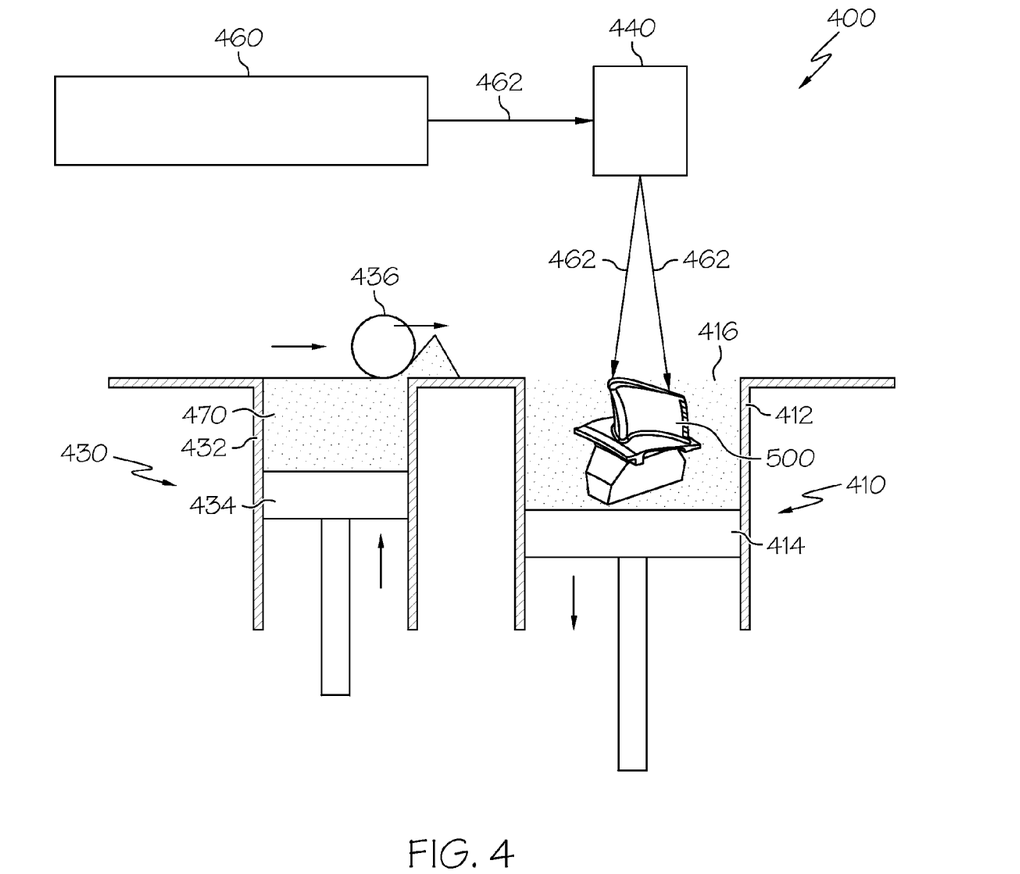
FIG. 4 is an exemplary system for forming an exemplary intermediate turbine component.
Figure 5:
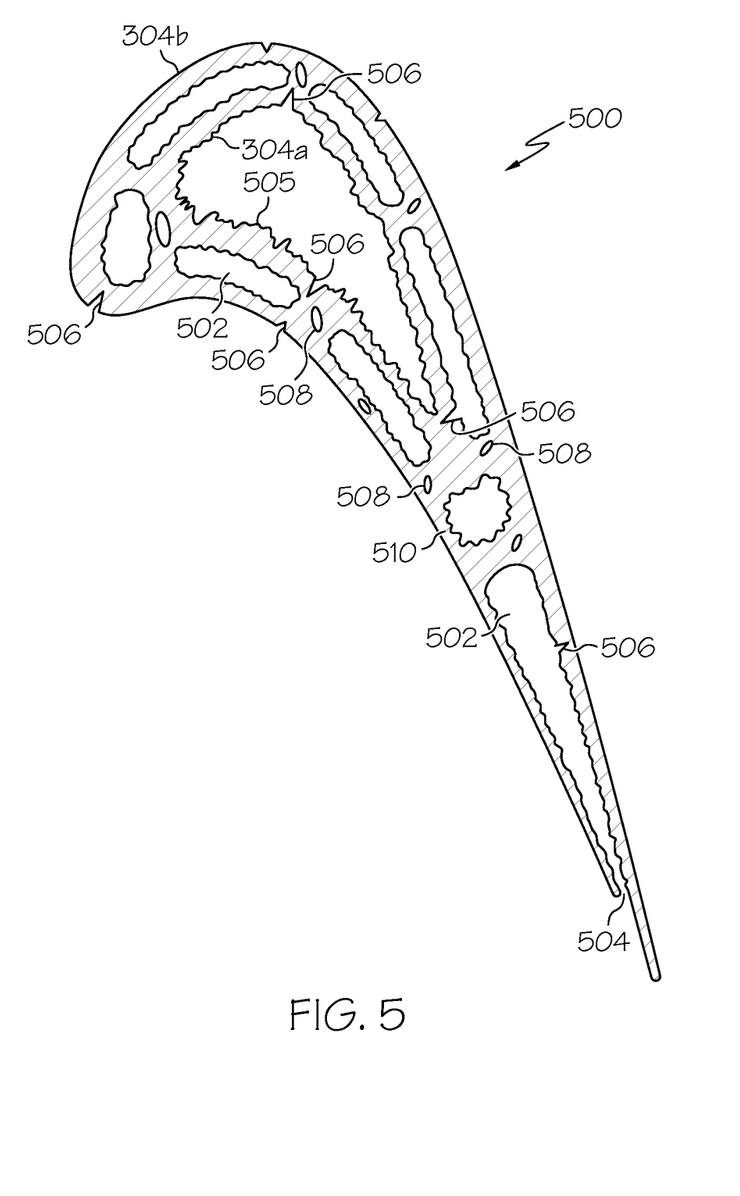
FIG. 5 is a cross-sectional view of an exemplary intermediate turbine component including a substrate and having a plurality of internal passages, the intermediate turbine component having internal and surface-connected defects, with a polished external surface and rough internal passage surfaces.

FIG. 4 illustrates an exemplary system 400 for forming the intermediate component 500 described above and provided in step 310 of method 300. As noted above, the intermediate component 500 may be the intermediate turbine component as shown in FIG. 5. As noted above, the system 400 may be an additive manufacturing system such as a DMLS system that includes a fabrication device 410, a powder delivery device 430, a scanner 440, and a laser 460 and functions to produce the intermediate turbine component 500 from build material 470.

The fabrication device 410 includes a build container 412 with a fabrication support 414 carrying the intermediate turbine component 500 to be formed from the build material 470. The fabrication support 414 is movable within the build container 412 in a vertical direction and is adjusted in such a way to define a working plane 416. The delivery device 430 includes a powder chamber 432 with a delivery support 434 that supports the build material 470 and is also movable in a vertical direction. The delivery device 430 further includes a roller or wiper 436 that transfers build material 470 from the delivery device 430 to the fabrication device 410.

During operation, the fabrication support 414 is lowered and the delivery support 434 is raised. The roller or wiper 436 scraps or otherwise pushes a portion of the build material 470 from the delivery device 430 to form the working plane 416 in the fabrication device 410. The laser 460 emits a laser beam 462, which is directed by the scanner 440 onto the build material 470 in the working plane 416 to selectively fuse the build material 470 into a cross-sectional deposit layer of the intermediate turbine component 500. More specifically, the laser beam 462 selectively fuses the powder of the build material 470 into larger structures by rapidly melting the powder components. As the scanned laser beam 462 moves on, heat is conducted away from the previously melted area, thereby leading to rapid cooling and resolidification. As such, based on the control of the laser beam 462, each deposit layer of build material 470 will include unsintered build material 470 and sintered build material that forms the cross-sectional deposit layer of the intermediate turbine component 500. Any suitable laser and laser parameters may be used, including considerations with respect to power, laser beam spot size, and scanning velocity.

The intermediate component may be manufactured from a build material 470 including a superalloy such as a nickel-based superalloy or a cobalt-based superalloy, as well as high temperature stainless steels, titanium, chromium, or other alloys, or a combination thereof. Exemplary high temperature, high strength DMLS polycrystalline alloys include a high temperature nickel base superalloy such as MAR-M-247 (also known as MM 247) and IN 718 or IN 738 available (in powder form) from, for example, Allegheny Technologies Incorporated (ATI), Pittsburgh, Pa. Notable substrate materials (for epitaxial deposits include directionally-solidified (DS) alloys such as DS CM247 LC and single-crystal (SX) alloys such as CMSX-486 available (in ingot form) from, for example, the Cannon Muskegon Corporation, Muskegon, Mich. Epitaxial deposits involve fusing the powder and remelting the underlying build material such that during solidification, the deposit takes on the crystallographic orientation of the substrate, ideally a directional solidified polycrystalline or single crystal structure. Nickel and cobalt-based superalloys are most often used to fabricate gas turbine components because of the high strength required for long periods of service at the high temperatures characteristic of turbine operation. The powder build material 470 may be selected for enhanced strength, durability, and useful life, particularly at high temperatures. Each successive deposit layer of the intermediate component may be, for example, between 10 m and 200 m, although the thickness may be selected based on any number of parameters. It is to be understood that for other components not subjected to high temperatures, other build materials may be used in additive-manufacturing processes as known in the art to form the intermediate component from which the component is manufactured.

Upon completion of a respective deposit layer, the fabrication support 414 is lowered and the delivery support 434 is raised. The roller or wiper 436 again pushes a portion of the build material 470 from the delivery device 430 to form an additional deposit layer of build material 470 on the working plane 416 of the fabrication device 410. The laser beam 462 is again controlled to selectively form another cross-sectional deposit layer of the intermediate turbine component 500. This process is continued as successive cross-sectional deposit layers are built into the intermediate turbine component 500. When the laser sintering process is completed, the unsintered build material 470 is removed and the intermediate component 500 is removed from the fabrication device 410 in anticipation of the subsequent steps discussed below. Although the DMLS process is described herein, other suitable additive manufacturing processes may be employed to fabricate the intermediate component 500.

Post-laser fusion processing may be performed on the intermediate component 500 formed by the additive-manufacturing technique. Such post-laser fusion processing may include, for example, stress relief heat treatments, peening, polishing, hot isostatic pressing (HIP), or coatings. In some embodiments, one or more of the post-laser fusion processing steps discussed below are not necessary and may be omitted.

FIG. 5 shows an exemplary intermediate component 500 (an intermediate turbine component) formed by an additive manufacturing process, such as the DMLS process described above. According to an exemplary embodiment, a turbine component will be formed from the intermediate turbine component (also identified with reference numeral "500" for ease of illustration). The intermediate turbine component 500 includes internal passages 502 such as internal cooling passages such as those in cooled high effectiveness advanced turbine (HEAT) blade and nozzle parts. Such turbine components may be capable of withstanding higher temperatures and stresses, thereby leading to further improvements in engine performance. The cooling passages deliver a cooling flow to the finished turbine component via an inlet (not shown) during engine operation. The cooling flow exits out various cooling holes (not shown) and out the trailing edge exit slot 504. The cooling passages may be relatively complex and intricate for tailoring the use of the limited pressurized cooling air and maximizing the cooling effectiveness thereof and the overall engine efficiency. The internal surfaces 304a of the internal passages 502 ("internal passage surfaces") illustrated in FIG. 5 are rough, being uneven and irregular, such surface roughness indicated with reference character 505. Surface roughness may be caused by contamination, incomplete fusion, debris, oxidation, or the like. Random near-surface components (i.e., debris) are identified in FIG. 6 with reference character 507. While not shown, the external surface 304b of the intermediate component 500 may also exhibit surface roughness.

As a result of the additive manufacturing process, the intermediate component 500 may include internal passage surface roughness, external surface roughness (external surface roughness not shown in FIG. 5), or both. The intermediate component 500 may also include surface connected porosity and cracks 506 and internal porosity and cracks 508 within the material substrate 510, as well as interface defects (not shown in FIG. 5) and may not be suitable for use without further processing to reduce or substantially eliminate such defects. The term "porosity" used herein refers to a defect that includes small spaces or voids within the material substrate 510. The term "cracks" used herein refers to linear defects or voids within the material substrate 510, and includes microcracks. As noted above, the term "surface-connected defects" includes defects (porosity and cracks) at the surface, near surface and subsurface with the cracks having faying surfaces, as noted above.

Figure 6:
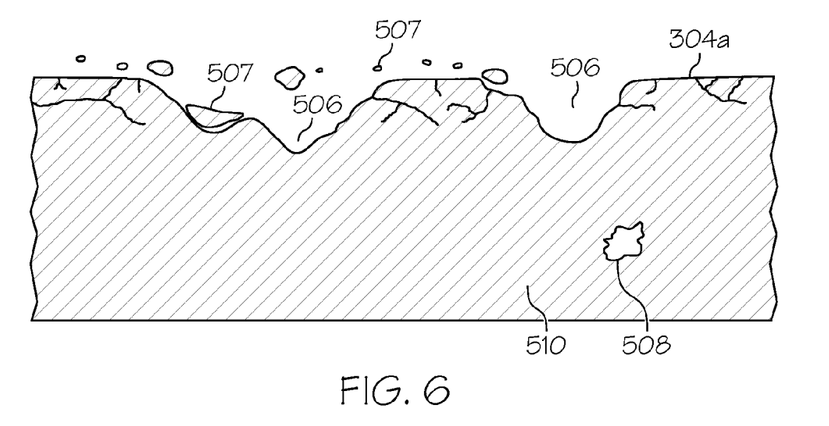
FIG. 6 is a cross-sectional representation of a portion of the substrate of the exemplary intermediate turbine component of FIG. 5, further illustrating an internal defect and a representative rough internal passage surface having surface-connected defects.

FIG. 6 illustrates a portion of the intermediate component of FIG. 5, including a portion of the material substrate 510 and a representative rough internal passage surface thereof. The material substrate 510 also includes an exemplary internal defect 508. As noted above, for components with high surface roughness, the structural integrity and mechanical properties thereof may be compromised. In addition, for those components with high surface roughness also needing a reduction in internal and surface-connected defects, surface-connected defects thereof may not be successfully bridged and covered by an encapsulation layer to convert the surface-connected defects into internal defects in preparation for subsequent HIP processing. As noted above, HIP processing reduces or substantially eliminates internal defects.

Figure 7:
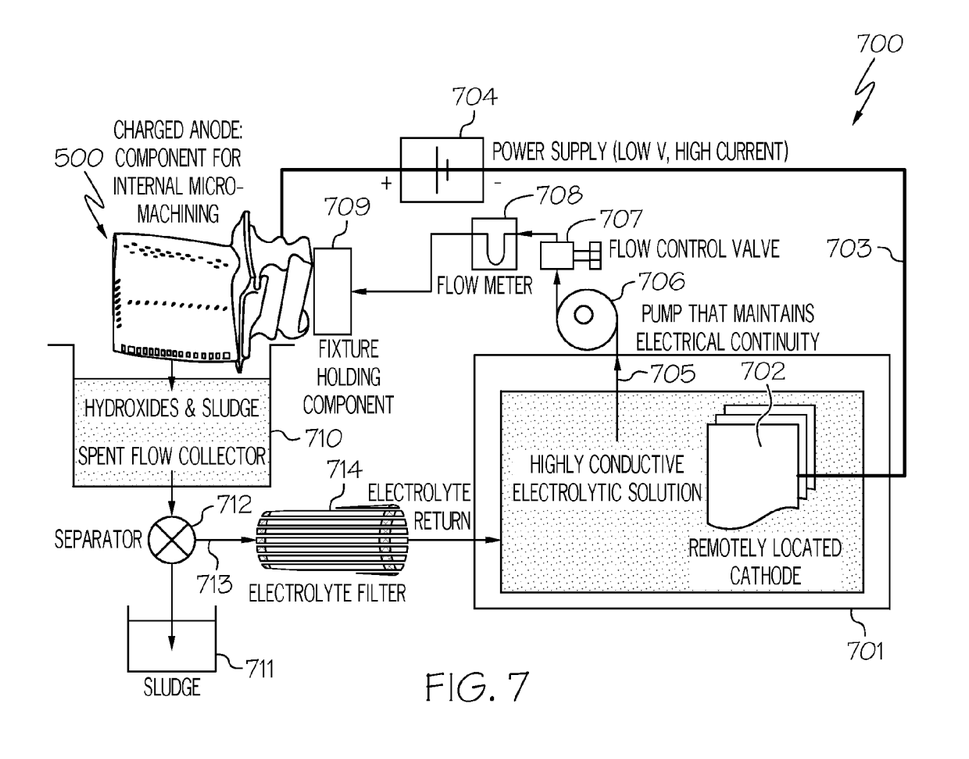
FIG. 7 is a is block diagrammatic view of an example of an electro-chemical micro-machining system in accordance with exemplary embodiments.

Referring now to FIG. 7, the described embodiments utilize an electro-chemical micro-machining (ECMM) system 700 to reduce surface roughness of internal surfaces of DMLS-formed components, thereby forming an enhanced internal surface. As initially noted above, conventional electro-chemical machining (ECM) utilizes a tool (cathode) that feeds towards the machined part (anode) to remove material. ECM is a controlled anodic dissolution of an electrically conductive work piece (the anode) due to a flow of high current at a low voltage difference through an electrolytic solution (typically a water-based neutral salt solution). The prior art ECM will not machine internal features since the tool (cathode) cannot be inserted inside the passages. The presently described ECMM embodiments utilize a remotely located cathode immersed in a highly conductive electrolytic solution. In some embodiments, it may be advantageous to clean the surfaces to be electro-chemically micro-machined of the component 500 by utilizing an acid etch or a fluoride ion cleaning process prior to the ECMM operation to remove oxides and to ensure good electrical continuity with the electrolyte solution.

With particular reference to the components of the ECMM system 700, illustrated is a cathode 702 that is remotely located from the charged anode, namely intermediate component 500. As used herein, the term "remotely located" means that the cathode 702 is positioned completely externally to (i.e., outside the outermost bounds of) all features of the intermediate component 702, and in particular is located completely externally to the internal cooling passages 502 of component 500. The cathode 702 is positioned in an electrolyte reservoir 701. The electrolyte reservoir contains a highly-conductive electrolyte solution, which may include, for example, a water-based neutral salt solution. The electrolyte concentration and electro-potential used in the machining operation is optimized based on process trial samples. In some embodiments, the electrolyte is a water based solution including sulfur dioxide (for increased cathodic reaction) and tetra-butyl ammonium bromide for enhanced thermal conductivity. Other electrolyte embodiments may also be utilized.

The electrolyte solution from the reservoir 701 is transferred via electrolyte flow line 705 using the mechanical action of a suitably configured pump 706, flow control valve 707, and flow meter 708. The pump draws the solution through line 705, and the amount of flow is regulated by valve 707, which operates at the direction of flow meter 708. Line 705 directs the flow of electrolyte solution to the anode, namely the component 500, which is held firmly in place by a fixture holding component 709 attached to, for example, the mounting dovetail portion 212 of the component 500. The holding component 709 may orient the component 500 in any desirable manner, including horizontally as shown in FIG. 7, although generally any orientation may be suitable. The electrolyte flow may be directed to enter the component 500 through the dovetail portion 212 thereof (in the same manner as cooling air would flow thereto).

An electrical potential difference is applied between the remotely-located cathode 702 and the anode 500 with the use of a power supply 704 providing a relatively low voltage and a relative high current via electrical line 703. The component is a positively charged anode flushed in the electrolytic solution. In some embodiments, the component is charged with low voltage electrical potential from about 5 to about 50 volts, utilizing an electrical current from about 50 to about 5000 amperes ("amps"). In other embodiments, different voltages and/or currents may be used. The current flows through the electrolyte and the interior of the component is polished, according to the known principles of electropolishing.

The electrolytic solution is flushed through the internal cooling passages during the ECMM process until the appropriate amount of material is removed. The time required for flushing may be determined for an individual component based on testing using progressively longer flush times until a suitable degree of material removal is observed. The time required is also based on the desired operation to be performed. For example, merely smoothing the internal surfaces will require less time than opening-up flow passages, both of which were described above as embodiments of the present disclosure.

Upon passing through the cooling air flow circuits 502 within the component 500, the electrolyte solution may exit the component 500 through the exit slot 504, for example, or through any of the other cooling air exits passages as may be provided in a particular component, an a manner as cooling air would exit the component. The electrolyte's passage through the interior cooling air channels of the component allows the electrolytic polishing thereof. Excess material (chemically polished away material, also referred to as "sludge") exits the component dissolved in or otherwise suspended in the electrolyte solution. The component 500 may be configured so that the electrolyte solution substantially avoids contact with external surfaces of the component 500 (orienting the component 500 with the exit slots facing downward is one manner in which this may be achieved), thereby avoiding any machining thereof. Rather, the electrolyte solution is directed primary to contact with the internal surfaces of the component to perform ECMM thereon. The spent electrolyte solution is collected (by gravity, for example) in a spent electrolyte reservoir 710. The spent electrolyte may thereafter be processed through a suitable separator 712 configured to separate the polished away material or sludge from the electrolyte solution, leaving the sludge in a waste receptacle 711. The electrolyte solution passes from the separator via line 713 to a filter 714 to insure that particulate matter removed from the component 500 is removed from the electrolyte solution as it is recirculated through the system 700 by pump 706. A lesser or greater quantity of the filter 714 could be used, as necessary or desirable according to the application. Two or more filters 714 may optionally be provided.

In this manner, an internally micro-machine component is fabricated. The micro-machining process removes the surface roughness 505 from within the internal passages of the component 500. The cathode remains entirely outside of the component at all times, which allows for small, complex configurations of internal surfaces (cooling channels, etc.) to be suitably micro-machined using the presently described embodiments.

In an alternate embodiment, a progressive electrolytic resistive layer process is disclosed that utilizes a special form of anodic electrochemical micro-machining having a beneficial precipitate layer to improve the surface finish of internal and external surfaces. This process does not require the flowing of an electrolyte solution; rather, the component is placed in a fluid reservoir, such as reservoir 701 or 710. The process is performed, as will be described below, to avoid harming the external features of the component 500, while still allowing for the micro-machining of the internal passages of the component 500, even though the entire component 500 is placed in the reservoir. The power supply 704 operates as described above, but the pump 706, control valve 707, flow meter 708, separator 712, and filter 714 need not be operating during the micro-machining process (and as such, their presence in this embodiment is not strictly required). Elements of the system include a tank of electrolyte, a cathode (typically a stainless steel plate), with the component 500 immersed such that air bubbles are not entrapped or form from dissolved air. A suitable holding rack or clip, typically fabricated from titanium, may suffice to hold the component 500, as is commonly used for electroplating. Alloys such as titanium are used which are chemically inert to corrosion and are 'noble' with respect to electrochemical reactions compared to the component 500. Most of the titanium clip may also be coated with a PVC coating, except for the last ½" or so that needs to form an electrical contact with the component 500. Utilization of a PVC coating may be desirable since PVC is chemically inert to acids or caustics commonly used for plating. Hangers for the rack and cathode plate are like those used for electroplating and are connected to a suitable power supply. In some embodiments, it may be advantageous to clean the surfaces to be electro-chemically micro-machined of the component 500 by utilizing an acid etch or a fluoride ion cleaning process prior to the ECMM operation to remove oxides and to ensure good electrical continuity with the electrolyte solution.

As generally known to those having ordinary skill in the art, during anodic chemical etching of superalloys, a precipitate is commonly observed to form on the etched surface as metallic ions attempt to dissolve in the electrolyte and move towards the cathode. In this context, the word "etching" refers generally to the chemical removal of metal. The more soluble metallic ions dissolve and migrate towards the cathode where they plate out with varying success. Some elements may adhere or plate onto the cathode, while other ions may be reduced to a metallic state but do not adhere to the cathode, dropping to the bottom of the reservoir as "sludge". The precipitate is formed as various alloying elements chemically react with the electrolyte rather than dissolve. The precipitate may also contain insoluble carbides or other alloying phases having relatively poor electrical conductivity or limited solubility. It is observed that the precipitate may act like an electrical resistor, which limits future current flow to that location. That is, precipitate forms first on the most electrically conductive features such as edges and corners of component 500, and spreads progressively towards the lesser conductive regions and may eventually cover all the surface of the component 500. Once covered totally with precipitate, there may still be sufficient electric current for etching or metal removal to continue, but at a slower pace. The chemical nature and electrical conductivity of the precipitate is a function of the electrolyte, the electric field, and ambient conditions. Food grade phosphoric acid (70% or diluted) is a common electrolyte that results in precipitate formation when used on superalloys. It may be necessary to drain and replenish the electrolyte in the internal passages one or more times to maintain the desired conditions of the electrolyte chemistry, to remove any interfering by-products, and to maintain a progressively forming resistive layer.

This embodiment is performed by promoting and maintaining a beneficial precipitate layer on the most electrically conductive areas of the component 500. To maintain the precipitate, the evolution of oxygen bubbles must be suppressed or such bubbles will dislodge the precipitate or act as barriers to current flow, especially if bubbles are entrapped in passageways. It is necessary to control the current density (which may be expressed as amps per square inch of anode surface), since the conductive surface area is dynamic and changing with time as the resistive precipitate area grows progressively. With the precipitate formed thereon, the etching or machining thereof slows. This allows the component 500 to be immersed in the electrolyte solution without undesirably over-etching the exterior features of the component 500. In this manner, the internal passageways can be electrochemically machined without necessarily flowing the electrolyte. Thus, this process can etch or improve the surface finish of internal passages. The process may be utilized to smooth external surfaces as well as internal passages. In an alternative embodiment, the external surfaces may be electrically masked with a non-conducting material so as to electrochemically machine only the internal passages of component 500.

Figure 8:
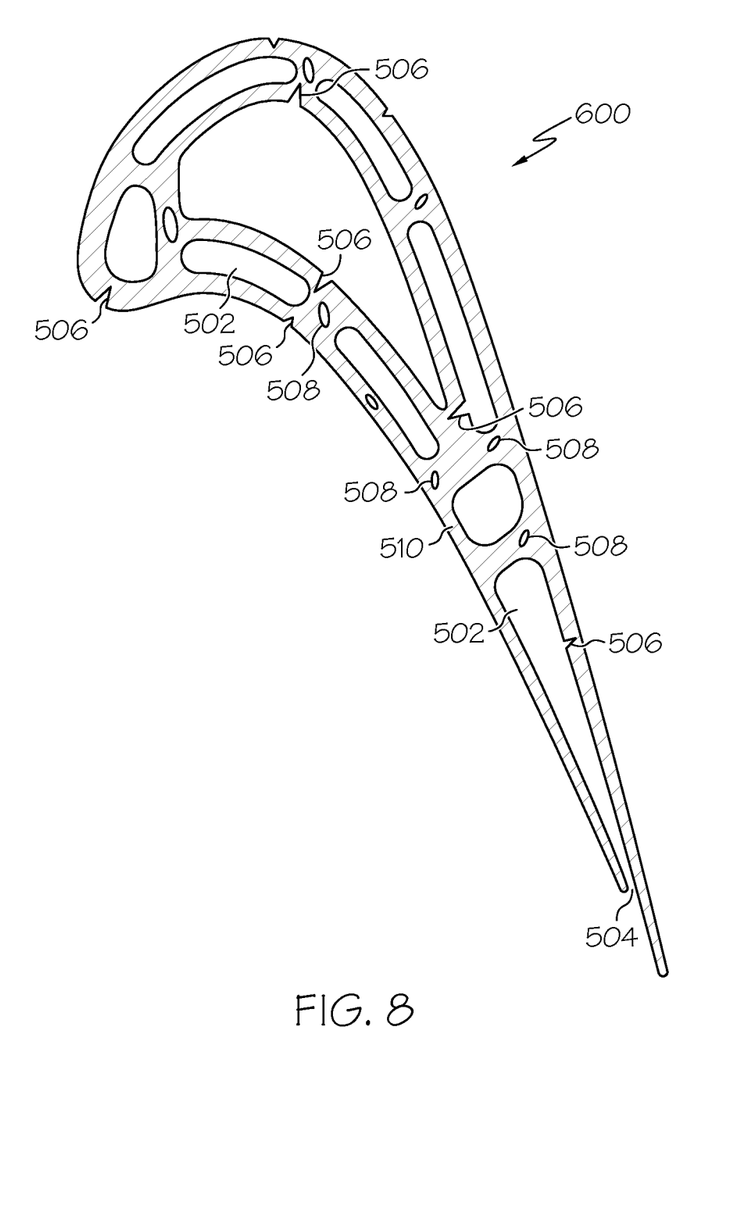
FIG. 8 is a cross-sectional view of an intermediate turbine component after electro-chemical micro-machining in the method of FIG. 3 in accordance with exemplary embodiments.

Regardless of the embodiment employed, for some components that are intended only to be exposed to low operating stresses, it may be sufficient to reduce internal surface roughness by performing step 320 without further processing. That is, if the surface finish is sufficient, the process is finished. FIG. 8 provides an exemplary intermediate component 600 post-ECMM processing in accordance with the disclosure above. As shown, the surface roughness 505 is substantially removed.

However, for other environments, concerns about surface-connected defects and internal defects may be relevant, as shown in FIG. 3 with decision steps 330 and 340. In accordance with exemplary embodiments, as illustrated in FIG. 3, surface roughness may be reduced along with converting surface-connected defects in the intermediate component into internal defects and/or concurrently with reducing or eliminating internal defects therein. To reduce or eliminate internal defects in the intermediate component, a hot isostatic pressing (HIP) process or other consolidation process may be performed along with the ECMM process 320. In the hot isostatic pressing process, the component is subjected to elevated temperatures and pressures over time. In general, the HIP process will not reduce defects such as porosity or cracks that are connected to the surface of the component. As noted above, HIP processing reduces or substantially eliminates internal defects. The HIP process may be performed at any temperature, pressure, and time that are suitable for forming a compacted solid having minor or acceptable levels of porosity. For example, the HIP process may be performed at a processing temperature in a range of about 1000° C. to about 1300° C. and may be performed at a pressure in a range of about 1 ksi to about 25 ksi for a time period of about 1 to about 10 hours. In other embodiments, the HIP processing temperature, pressure, and time may be higher or lower to form a compacted component having negligible cracks and porosity. The consolidated component may include the finished component.

While the HIP process on the intermediate component is described and illustrated as being performed after encapsulation, it is to be understood that the HIP process on the intermediate component may be performed without prior encapsulation. It is also to be understood that the HIP process may be performed anytime, in order to reduce or substantially eliminate internal defects.

Figure 10:
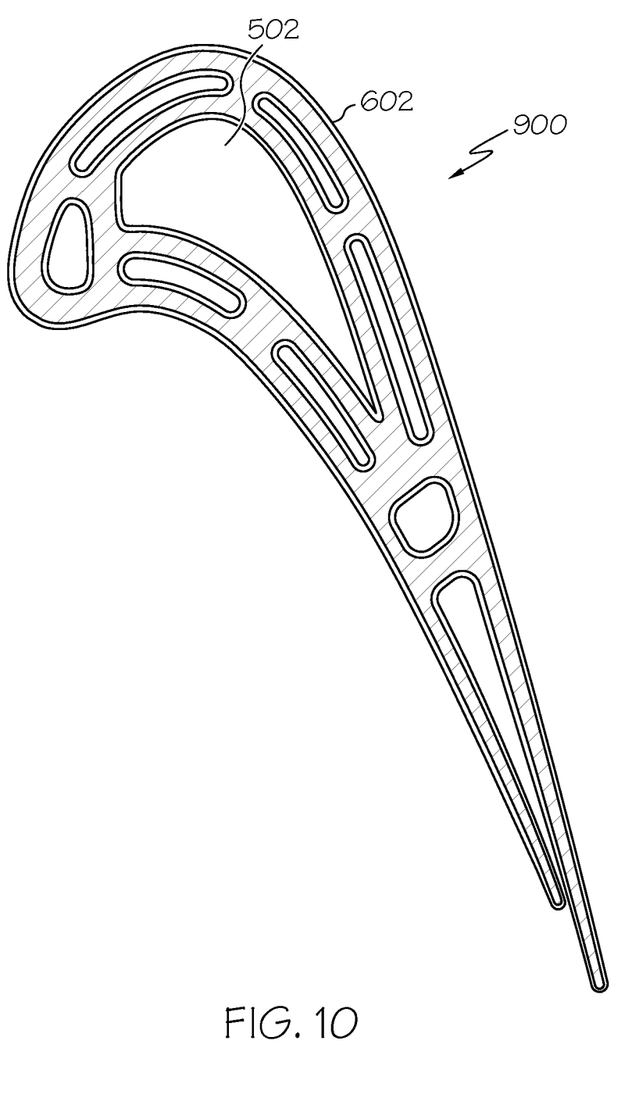
FIG. 10 is a cross-sectional view of a consolidated turbine component after HIP processing of the encapsulated component of FIG. 9 to reduce or eliminate the internal defects in the method of FIG. 3 in accordance with exemplary embodiments.
Figure 11:
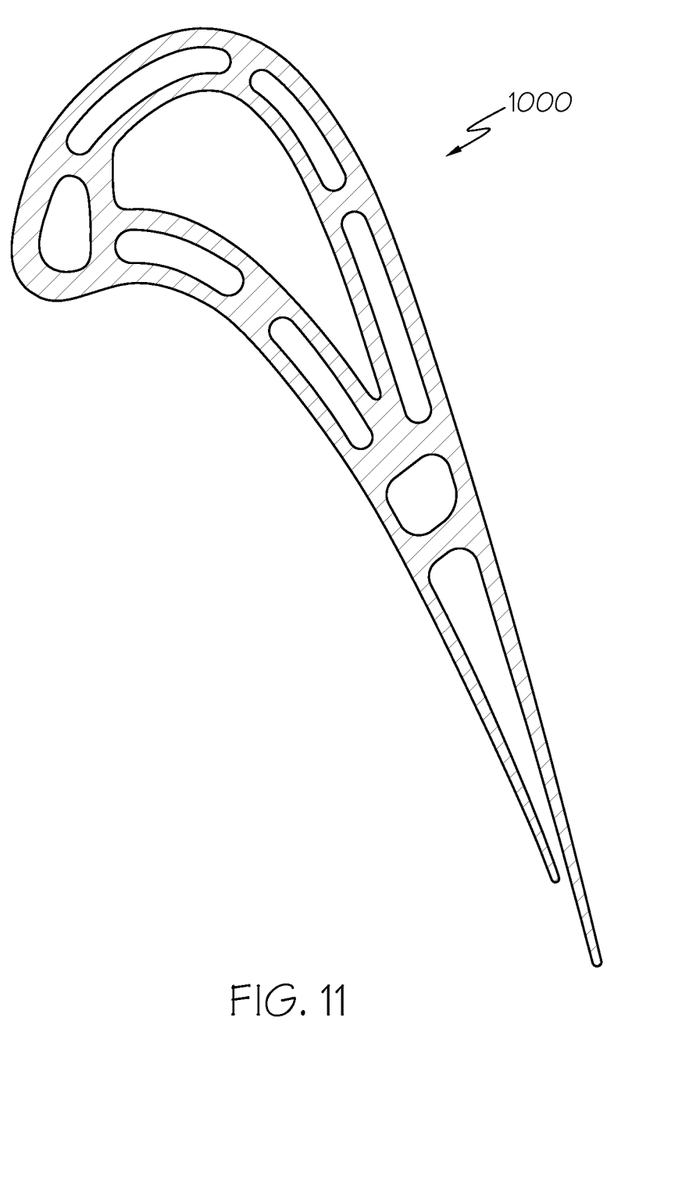
FIG. 11 is a cross-sectional view of a finished turbine component in the method of FIG. 3 after removal of the encapsulation layer from the consolidated turbine component of FIG. 9 in accordance with exemplary embodiments.

In other embodiments, converting the surface-connected defects into internal defects in preparation for HIP processing and/or HIP processing of the intermediate component 500 may occur after the surface roughness has been reduced. Referring again to FIG. 3 and to FIGS. 9-11, in accordance with an exemplary embodiment, method 300 continues by optionally finishing the intermediate component 500 (FIG. 8) to produce the finished component 1000 (step 380). The encapsulation and consolidation by a HIP process during finishing step 380 is used when a decision is made to use a non-diffusion coating on an improved surface component. Step 380 offers an encapsulation process for HIP with a minimal loss of thickness. The exemplary finished component illustrated in FIG. 11 is a finished turbine component in which internal passage surface roughness has been reduced, and the surface-connected defects and internal defects have been reduced or substantially eliminated. In some exemplary embodiments as noted above, no such finishing treatments are necessary and step 380 may be omitted. In step 380, the intermediate component 600 may undergo further processing including finishing treatments. Such treatments may include, for example, aging, solutioning, annealing, quenching, peening, polishing, hot isostatic pressing, or coatings, such as bond coatings, thermal barrier coatings, or the like. Although step 380 is referred to as a finishing treatment, such treatments may be used at other times, as hereinafter described. As one example, surface peening or polishing of the external surface may be provided before, during, or after reducing the surface roughness of the internal passage surface(s).

Figure 9:
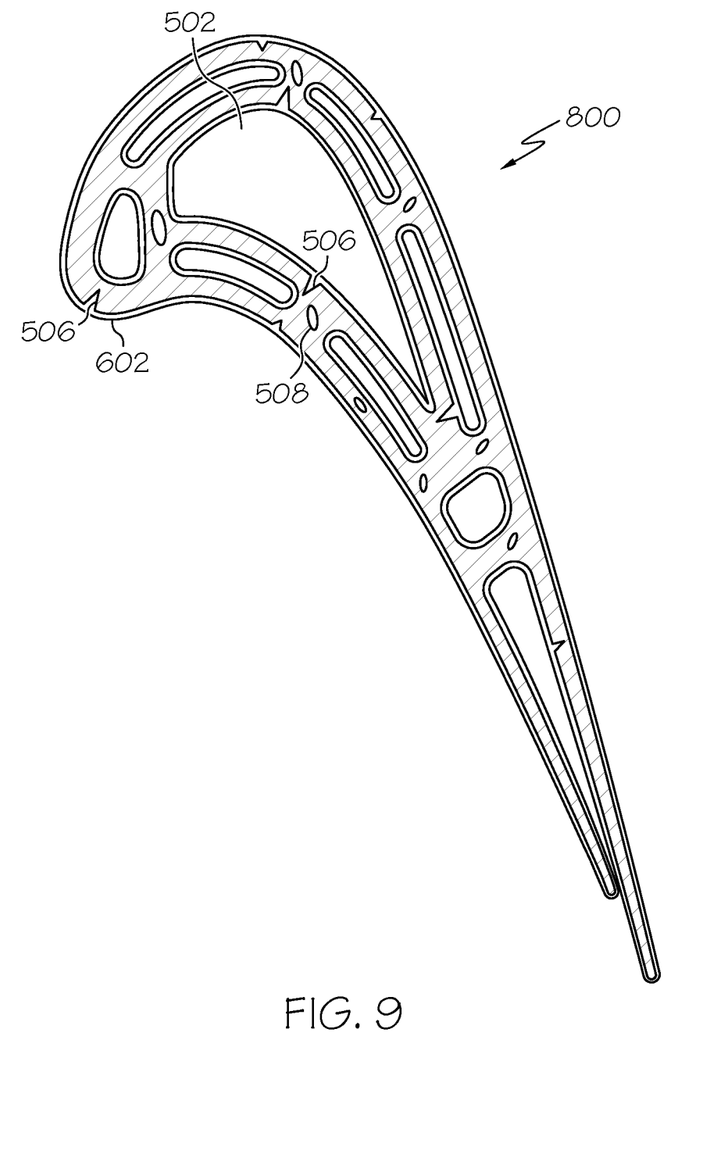
FIG. 9 is a cross-sectional view of an intermediate turbine component after encapsulation in a finishing step to form an encapsulated component, in the method of FIG. 3 in accordance with exemplary embodiments.

Examples of a finishing treatment of step 380 are discussed below with reference to FIGS. 9 and 10. FIGS. 9 and 10 are successive cross-sectional views of the step 380 applied to the intermediate turbine component 600 (FIG. 8) after the ECMM process of step 320. Referring now to FIG. 9, the intermediate turbine component of FIG. 8 is shown encapsulated with an encapsulation layer 602 forming an encapsulated component 800. Encapsulation layer 602 refers to an encapsulation layer formed during the finishing step 380. The encapsulation layer 602 also functions to effectively convert the surface porosity and cracks 506 into internal porosity and cracks 508. For example, the surface porosity and cracks 506 of FIG. 5 are effectively internal porosity and cracks 508 in FIG. 9 as a result of the encapsulation layer 602. Any suitable encapsulation process may be performed that bridges and covers the porosity and cracks in the at least one surface of the component. For example, the encapsulation layer 602 may have a thickness of approximately 10-100 um, although any suitable thickness may be provided. Such encapsulation layer may be subsequently removed (see FIG. 11) or maintained to function as an oxidation protection layer. The encapsulation layer may be a metal or alloy that is compatible with the substrate material and may be formed, for example, by a plating process or a coating process, as hereinafter described. In various exemplary embodiments, the encapsulation layer 602 of finishing step 380 may be formed for example, by electroless plating or electroplating processes. In further embodiments, the encapsulation layer may be formed by processes including cobalt plating, sol-gel chemical deposition techniques, chemical vapor deposition techniques, or low pressure plasma sprays. A suitable material for the encapsulation layer is one which when applied or when heated to the HIP temperature is relatively ductile and free of gaps or cracks and which spans the surface-connected porosity and cracks 506 within, for example, the internal passages 502. As noted above, other examples of suitable encapsulation layers 602 include an aluminide diffusion coating or other diffusion coating.

Referring now to FIG. 10, another exemplary finishing treatment of step 380 includes consolidating the intermediate component and the encapsulation layer by, for example, the hot isostatic pressing process (step 384) in which the component is subjected to elevated temperatures and pressures over time to form a consolidated component 900. The encapsulation layer 602 provided in FIG. 9 (or the encapsulation layer provided by steps 320 and 340) functions to internalize any such surface connected defects (e.g., surface connected porosity and cracks) such that the HIP process is effective for all or substantially all of the internal cracks or porosity in the material substrate 510, including cracks and porosity that would otherwise be surface porosity and cracks 506 as illustrated in FIG. 8. The consolidated component may include the finished component. While the HIP process of the finishing step 380 is also described and illustrated as being performed after encapsulation, it is to be understood that the HIP process 384 may be performed without prior encapsulation (step 382). Again, it is to be understood that the HIP process may be performed anytime, in order to reduce or substantially eliminate internal defects.

While the method illustrated in FIG. 3 involves various decision questions, it should be understood that not all the decision questions necessarily apply in the manufacture of a particular component. For example, if only surface roughness is of concern, the method may stop after step 320 has been performed (i.e., if decision steps 330 and 340 are answered in the negative. If internal defects are the only concern, consolidation (step 384) only may be performed.

Returning again to FIG. 3, upon completion of step 320 or step 380, the component produced in accordance with exemplary embodiments may be machined to the final specifications. The machining techniques for a turbine component may include, for example, the addition of a tip cap, formation of cooling holes, and grinding the rotor tips as known in the art. At this point, the turbine component 1000 in FIG. 11 corresponds to the completed turbine component 200 shown in FIG. 2. The completed component may be positioned for its intended use. For example, a completed turbine component may be installed in a turbine section of the gas turbine engine as shown in FIG. 1.

Accordingly, methods in accordance with exemplary embodiments may reduce surface roughness and/or improve metallurgical quality of components formed by additive manufacturing processes. These methods yield components with improved overall structural integrity, cosmetic appearance, functionality, mechanical properties, and fatigue life/strength. Exemplary embodiments also reduce or substantially eliminate surface-connected and internal defects of the components. These methods also improve yield and enable improved development cycle times and reduced tooling costs associated with component manufacturing without sacrificing component performance or durability. Additionally, these methods permit internal configurations for components not otherwise possible with conventional fabrication technologies, without elaborate tooling.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A method for manufacturing a component, the method comprising the steps of:
connecting a component comprising an internal passage to a power supply such that the component functions as an anode, wherein the internal passage of the component has an entrance opening and an exit opening, wherein walls of the internal passage of the component exhibit a first roughness, and wherein the component is formed by a process that results in the walls of the internal passage having the first roughness;
connecting a cathode to the power supply, the cathode being disposed in an electrolyte solution, the electrolyte solution being located in a reservoir that does not have direct physical contact with the component, an entirety of the cathode being positioned externally to the internal passage of the component;
contacting the internal passage of the component with the electrolyte solution, wherein said contacting comprises flowing the electrolyte solution into the entrance opening, through the internal passage, and out of the component via the exit opening; and
using the power supply, applying an electrical potential difference and current flow between the component and the cathode, wherein, upon and subsequent to the applying the electrical potential difference, the walls of the internal passage of the component exhibit a second roughness, the second roughness being relatively more smooth than the first roughness.

2. The method of claim 1, wherein connecting the component comprises connecting a turbine blade.

3. The method of claim 2, wherein connecting the component comprising the internal passage comprises connecting the turbine blade comprising an internal cooling air circuit.

4. The method of claim 1, wherein contacting the internal passage comprises pumping the electrolyte solution from the reservoir to the internal passage.

5. The method of claim 4, wherein contacting the internal passage is performed so as to substantially avoid contacting external surfaces of the component with the electrolyte solution.

6. The method of claim 5, further comprising draining the electrolyte solution from the internal passage through a cooling air exit slot of the component, the cooling air exit slot being connected to an internal cooling air circuit.

7. The method of claim 1, wherein the process used to form the component is an additive manufacturing process chosen from direct metal laser sintering (DMLS), direct metal laser fusion (DMLF), and electron beam melting (EBM).

* * * * *